US009034186B2

(12) United States Patent
Biermans et al.

(10) Patent No.: US 9,034,186 B2
(45) Date of Patent: May 19, 2015

(54) CHROMATOGRAPHY COLUMNS

(75) Inventors: Franciscus Biermans, Vlissingen (NL); Jacobus Duvekot, Vrouwenpolder (NL)

(73) Assignee: Agilent Technologies, Inc., Santa Clara, CA (US)

( * ) Notice: Subject to any disclaimer, the term of this patent is extended or adjusted under 35 U.S.C. 154(b) by 1968 days.

(21) Appl. No.: 11/334,961

(22) Filed: Jan. 19, 2006

(65) Prior Publication Data
US 2006/0163161 A1 Jul. 27, 2006

(51) Int. Cl.
*B01J 20/26* (2006.01)
*B01J 20/285* (2006.01)

(52) U.S. Cl.
CPC ............... *B01J 20/262* (2013.01); *B01J 20/26* (2013.01); *B01J 20/285* (2013.01)

(58) Field of Classification Search
CPC ......... B01J 20/26; B01J 20/262; B01J 20/285
USPC .............. 210/198.2, 635, 656, 502.1; 96/101; 95/88
See application file for complete search history.

(56) References Cited

U.S. PATENT DOCUMENTS

| | | | | |
|---|---|---|---|---|
| 4,280,923 A | * | 7/1981 | Small et al. | 516/137 |
| 4,376,641 A | * | 3/1983 | Nestrick et al. | 95/83 |
| 4,923,486 A | * | 5/1990 | Rubey | 95/87 |
| 4,935,145 A | * | 6/1990 | Cortes et al. | 210/656 |
| 4,966,785 A | * | 10/1990 | Springston | 427/489 |
| 4,996,277 A | * | 2/1991 | Bradshaw et al. | 210/656 |
| 5,078,886 A | * | 1/1992 | Hsu | 210/635 |
| 5,183,660 A | | 2/1993 | Ikeda et al. | |
| 5,932,462 A | | 8/1999 | Harris et al. | |
| 2004/0185553 A9 | * | 9/2004 | Hei | 435/308.1 |

FOREIGN PATENT DOCUMENTS

| | | |
|---|---|---|
| EP | 0 352 388 A1 | 1/1990 |
| EP | 0 473 084 A2 | 3/1992 |
| EP | 1 372 360 A1 | 12/2003 |
| JP | 2000206102 A | 7/2000 |
| JP | 2002020505 A | 1/2002 |
| JP | 2004099868 A | 4/2004 |
| JP | 2004215062 A | 7/2004 |

OTHER PUBLICATIONS

Article by Poschalko, et al., entitled "DEUSS: A Perdeuterated Polyoxyethylene)-Based Resin for Improving HRMAS NMR Studies of Solid-Supported Molecules" published by Chem. Eur. J., 2004, 10, 4532-4537.

(Continued)

*Primary Examiner* — Ernest G Therkorn
(74) *Attorney, Agent, or Firm* — Milstein Zhang & Wu LLC

(57) ABSTRACT

A chromatography column is prepared with a stationary phase comprising a deuterated poly(ethyleneglycol), or other deuterated polymer. Formation of the stationary phase can be performed using exactly the same methodology as used when forming a stationary phase with the equivalent non-deuterated polymer. The deuterated poly(ethyleneglycol), or other deuterated polymer, preferably has increased thermal stability as compared to non-deuterated poly(ethyleneglycol), or equivalent non-deuterated polymer. This reduces bleeding of the stationary phase during gas chromatography and allows the use of greater operating temperatures.

14 Claims, 4 Drawing Sheets

(56) References Cited

OTHER PUBLICATIONS

Article by Dale, et al., entitled "Gas-Liquid Chromatography in Qualitative Analysis", published by Journal of Chromatography, 552, (1991), 161-167.

Article by Cardoso, et al., entitled "Preparation of Thermostable Poly(Ethylene Glycol) Using Thermal Treatment in Sealed System", published by J. Braz. Chem. Soc., vol. 11, No. 2, 191-194, 2000.

Article by Glastrup, Jens, entitled Stabilisation of Polyethylene and Polypropylene Glycol Through Inhibition of a -Positioned Hydroxyle Group Relative to an Ether Group, published by Polymer Degradation and Stability 81, (2003), 273-278.

Japanese Office Action for Application No. 2006-15228, mailed on Oct. 18, 2011 (5 pages).

Mitsuo Usui et al. "Low-loss polymeric optical waveguide with high thermal stability", NTT Opto-electronics Laboratories, IEICE, Sep. 9, 1994, vol. 94, No. 225, p. 19-24.

M. Usui et al. "Low-loss polymeric optical waveguides with high thermal stability", Electronics Letters, Jun. 9, 1994, vol. 30, No. 12, p. 958-959.

Ruth Schnabel "Synthesis of Deuterated Polyethylene Glycoles", Journal of Labelled Compounds and Radiopharmaceuticals, Feb. 1992, vol. 31, No. 2, pp. 91-94.

A. D. Dale et al. "Gas-liquid chromatography in qualitative analysis XIX. The use of delay the oxidation of polyoxyethylene glycol stationary phases", Journal of Chromatography, 1991, vol. 552, No. 1-2, pp. 161-167.

Koji Enbutsu et al. "Multimode Polymeric Optical Waveguides with High Thermal Stability Using UV Cured Epoxy Resins", Japanese Journal of Applied Physics, Jun. 30, 1998, vol. 37, No. 6B, pp. 3662-3664.

\* cited by examiner

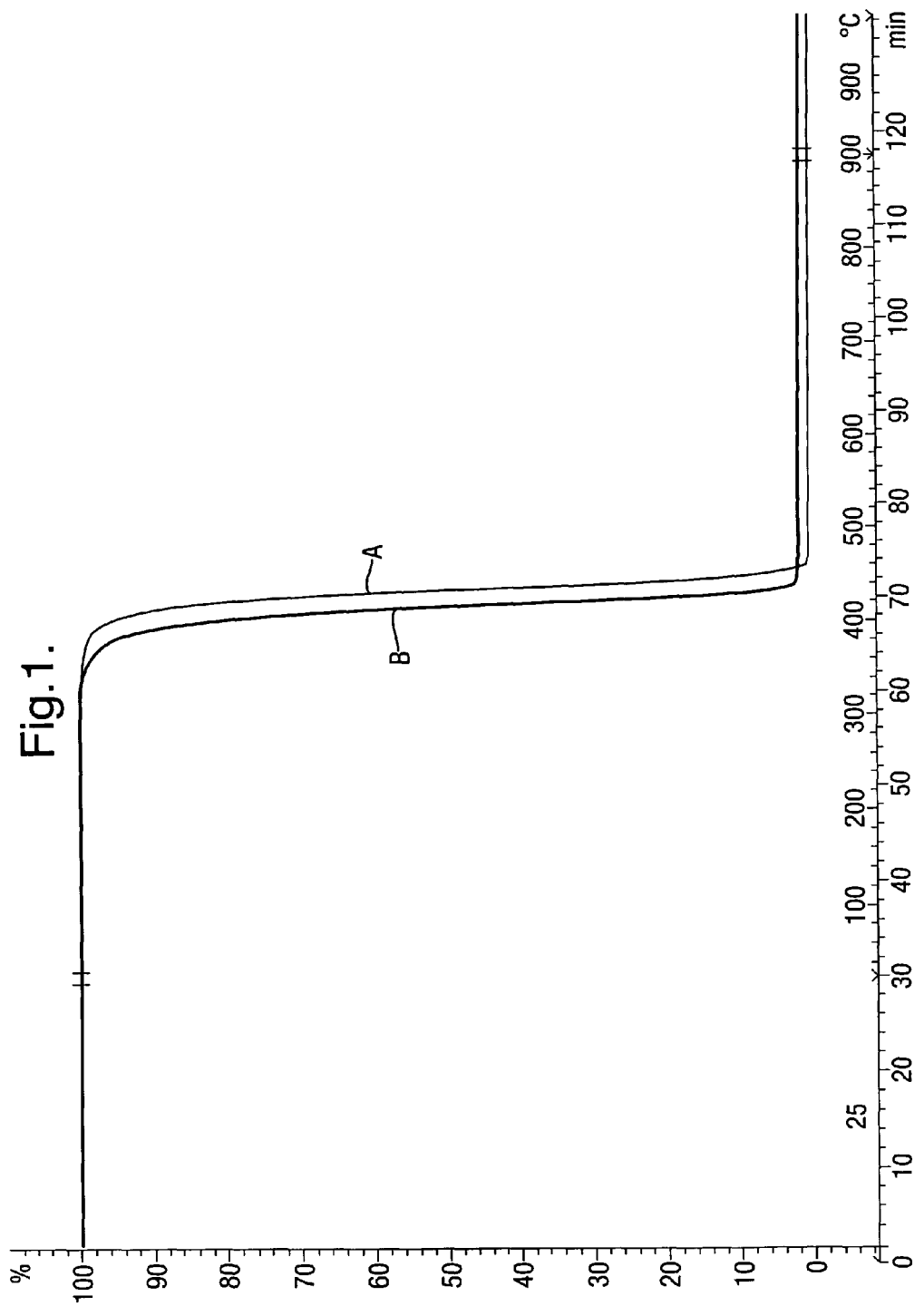

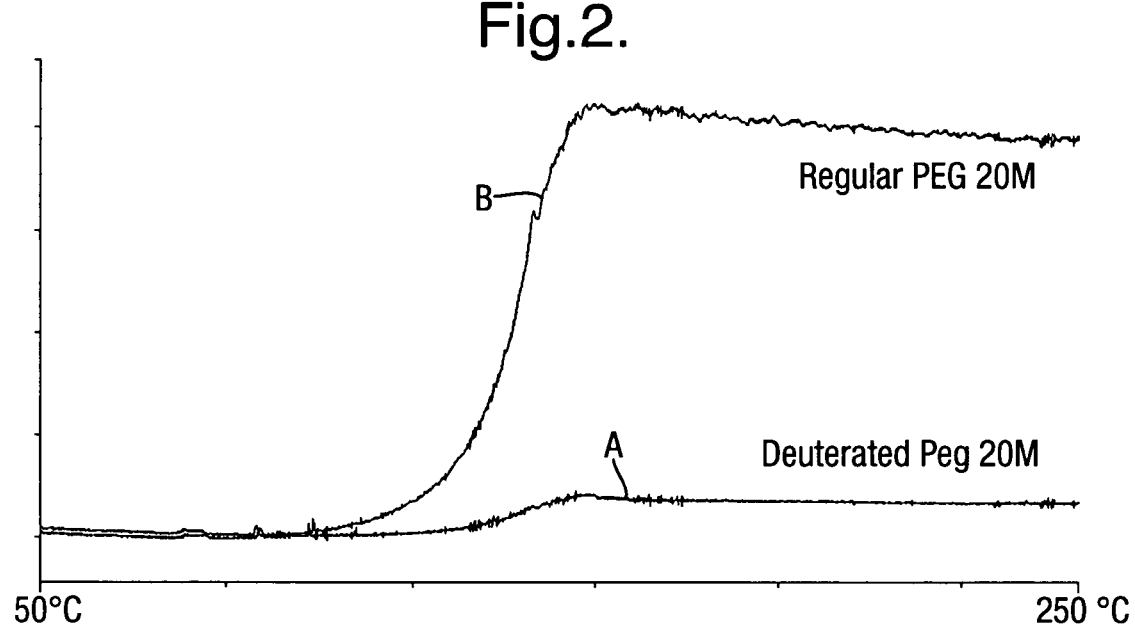

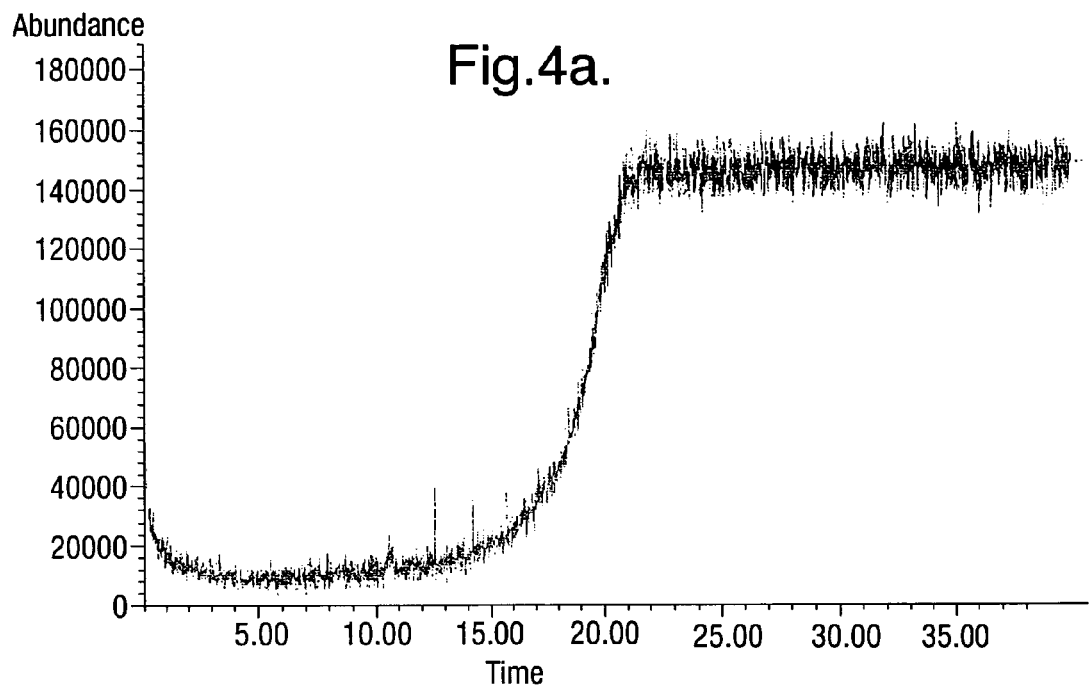
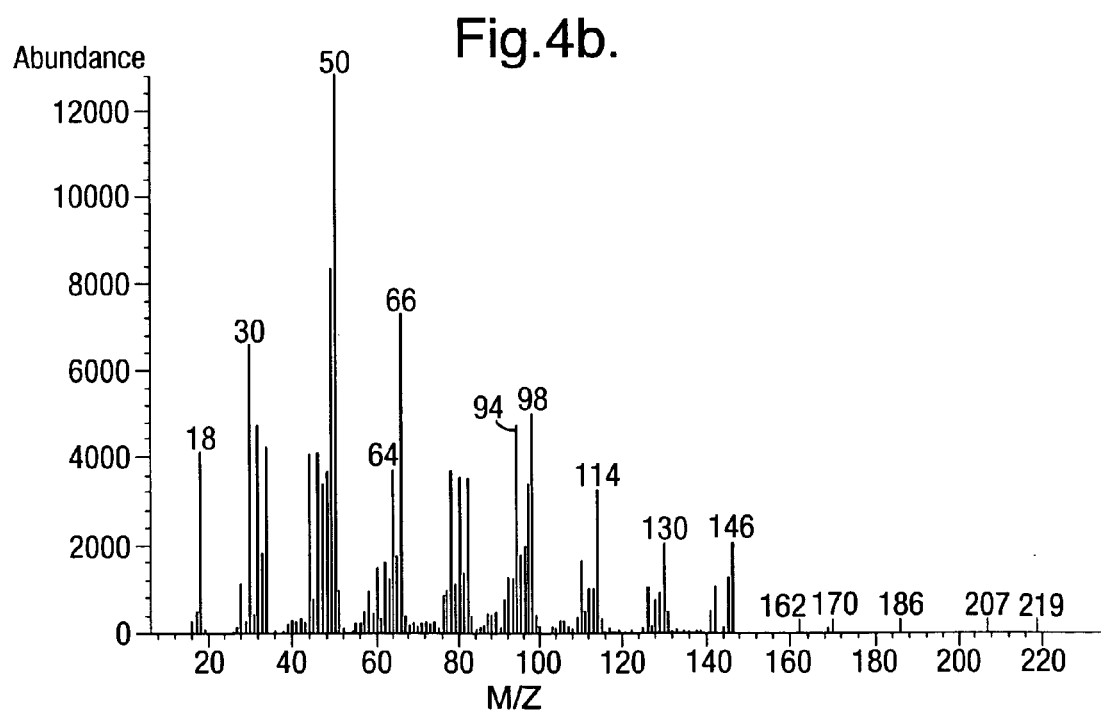

CHROMATOGRAPHY COLUMNS

BACKGROUND OF THE INVENTION

The invention relates to chromatography columns and to methods of preparing chromatography columns.

Gas chromatography columns having a stationary phase consisting of a poly(ethyleneglycol), commonly abreviated as PEG, are known. Other names for PEG are poly(ethylene oxide) or poly(oxirane). Poly(ethyleneglycol)s exist in various forms, all of which are polymers comprising a plurality of repeat units having the formula:

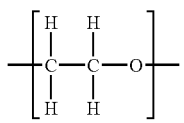

A basic form of poly(ethyleneglycol) is a straight chain molecule having a hydroxyl group at each end and being represented by the formula:

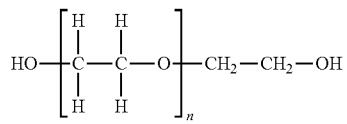

This form will be referred to as diol poly(ethyleneglycol).

However, there are many other forms of straight chain poly(ethyleneglycol) in which one or both of the terminal hydroxyl groups of diol poly(ethyleneglycol) are chemically modified or replaced. Common forms are monomethoxy and dimethoxy poly(ethyleneglycol), in which one or both of the terminal hydroxyl groups of diol poly(ethyleneglycol) are replaced with methoxy groups. Another poly(ethyleneglycol), described by Glastrup in *Polymer Degradation and Stability*, 81 (2003) 273-278, has an additional methyl group inserted between a terminal hydroxyl group and the adjacent ether linkage of diol poly(ethyleneglycol). Dale et al, in *Journal of Chromatography*, 552 (1991) 161-167, discloses poly(ethyleneglycol)s in which antioxidant groups are introduced into diol poly(ethyleneglycol) by esterification of one or both terminal hydroxyl groups. Many other forms of straight chain poly(ethyleneglycol), having a wide variety of terminal groups, are also known. Terminal groups in a particular poly(ethyleneglycol) may be the same as one another or different.

Poly(ethyleneglycol)s can also be made in a branched form. A branched poly(ethyleneglycol) comprises two poly(ethyleneglycol) chains covalently linked to a common core. The preparation of branched poly(ethyleneglycol)s is well known and described in, for example, U.S. Pat. No. 5,183,660 and U.S. Pat. No. 5,932,462. The free terminals of a branched poly(ethyleneglycol) may be hydroxyl or other groups and they may be the same or differ from one another.

Poly(ethyleneglycol)s can also be made in multi-arm form. These have three or more "arms" each comprising a poly(ethyleneglycol) chain. Multi-arm poly(ethyleneglycol)s are described in, for example, U.S. Pat. No. 5,932,462. The free terminals of a multi arm poly(ethyleneglycol) may be hydroxyl or other groups and they may be the same or differ from one another.

Poly(ethyleneglycol)s can also be made in cross-linked form. One way of doing this is to chemically modify both hydroxyl groups of diol poly(ethyleneglycol) so that the modified terminals can be cross-linked to one another. As both terminals participate in cross-linking, an insoluble network of poly(ethyleneglycol) chains is formed. Cross-linking of polyethylene chains can also be achieved by controlled thermal treatment as described by Cardoso et al in *Journal of Brazilian Chemical Society*, Volume 11, No. 2 (2000) 191-194.

Straight chain, branched, multi arm and cross-linked forms of poly(ethyleneglycol), with a variety of terminal groups (where appropriate) can all be used for the stationary phase of chromatography columns, especially gas chromatography columns. It is also possible to use mixtures of the different forms of PEG as a stationary phase. In the case of cross-linked poly(ethyleneglycol)s, the poly(ethyleneglycol) may first be introduced into the column before the cross-linking takes place in situ. Poly(ethyleneglycol)s, in the various forms, make particularly useful stationary phases for gas chromatography, because they have good selectivity (that is to say the ability to separate) for polar compounds.

However, a problem with the use of poly(ethyleneglycol)s for the stationary phase in gas chromatography is that poly(ethyleneglycol)s tend to have undesirably low thermal stabilities. At the temperatures commonly used for gas chromatography, poly(ethyleneglycol)s tend to break down. Fragments formed from the thermal degradation of poly(ethyleneglycol)s in gas chromatography columns are detected by mass spectrometry and flame ionisation detection (which are the main methodologies used to detect analytes). The detection of fragments from the thermal breakdown of poly(ethyleneglycol) stationary phases by mass spectrometry or flame ionisation detection gives rise to background noise which may decrease the sensitivity of detection for the analytes.

Additionally, the thermal instability of a poly(ethyleneglycol) stationary phase can reduce the working lifetime and maximum allowed operating temperature of a gas chromatography column.

There have been a number of attempts to improve the thermal stability of poly(ethyleneglycol). The introduction of antioxidant groups into poly(ethyleneglycol) as described in the article by Dale et al referenced above, the introduction of a methylene group as described in the article by Glastrup referenced above, and the thermally induced cross-linking as described in the article by Cardoso et al referenced above, have all been claimed to improve the thermal stability of poly(ethyleneglycol).

SUMMARY OF THE INVENTION

In accordance with a first aspect of the current invention, there is provided a chromatography column having a stationary phase comprising a polymer which comprises a plurality of repeat units having the formula:

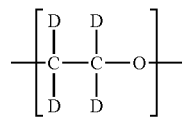

wherein D is deuterium.

In accordance with a second aspect of the current invention, there is provided a chromatography column having a stationary phase comprising a polymer, which comprises a plurality of component units arranged contiguously with one another, each one of the component units having a structure in accordance with the formula:

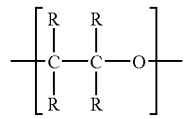

wherein each one of the —R groups is selected from the group consisting of hydrogen (—H) and deuterium (—D), and wherein a sufficient number of the —R groups in the polymer are deuterium so that the thermal stability of the polymer is greater than would be the case if substantially all the —R groups were hydrogen.

As used herein, the term "component units" refers to individual monomers of a polymer which may be either chemically the same as one another or different. The term "repeat units" refers to component units having the same chemical structure. The terms "contiguous" and "contiguously" refer to an arrangement of component units in which the units are immediately adjacent to one another in a polymeric chain.

In accordance with a third aspect of the current invention, there is provided a chromatography column having a stationary phase comprising a polymer which is at least partially deuterated to increase the thermal stability of the polymer.

In accordance with a fourth aspect of the current invention, there is provided a method of preparing a chromatography column comprising using a polymer to prepare a stationary phase of the column, the polymer being at least partially deuterated to increase the thermal stability of the polymer.

In preferred embodiments of the third and fourth aspects of the invention, the polymer comprises at least one chain of poly(ethyleneglycol), the at least one chain being at least partially deuterated.

In preferred embodiments of the invention, the use of deuterium leads to an increased thermal stability of the polymer, as compared to the thermal stability that would be exhibited if the deuterium was replaced with hydrogen. Increase in thermal stability may be due to the carbon-deuterium bond being more stable towards homolytic cleavage than the carbon-hydrogen bond (the so-called primary deuterium isotope effect). Additionally, it is possible that the presence of the deuterium increases the bond strengths of carbon-carbon bonds and carbon-oxygen bonds (the so-called secondary deuterium isotope effect). The primary and secondary isotope effects may result in a slowing down of the kinetics of PEG degradation. This contribution of the primary and secondary isotope effects is called a kinetic isotope effect. Hitherto, however, there has been no suggestion that the use of deuterium, in place of hydrogen, can increase the thermal stability of poly(ethyleneglycol)s.

BRIEF DESCRIPTION OF THE DRAWINGS

The following is a more detailed description of embodiments of the invention, by way of example, reference being made to the appended drawings in which:

FIG. 1 is a graph showing the thermogravimetric profiles of a deuterated poly(ethyleneglycol) and a non-deuterated poly (ethyleneglycol);

FIG. 2 shows the background noise (bleed) detected by flame ionisation detection for a column using a deuterated poly(ethyleneglycol) as the stationary phase and for a column using a non-deuterated poly(ethyleneglycol) as the stationary phase, as the column temperature increases from 50° C. to 250° C.;

FIG. 3b shows the molecular mass/charge of the fragments detected in FIG. 3a;

FIG. 4a shows bleeding of deuterated poly(ethyleneglycol) fragments from a column with a deuterated poly(ethyleneglycol) stationary phase, as detected by mass spectrosocopy; and FIG. 4b shows the molecular mass/charge of the fragments detected in FIG. 4a.

DETAILED DESCRIPTION OF THE INVENTION

Figure 3A:
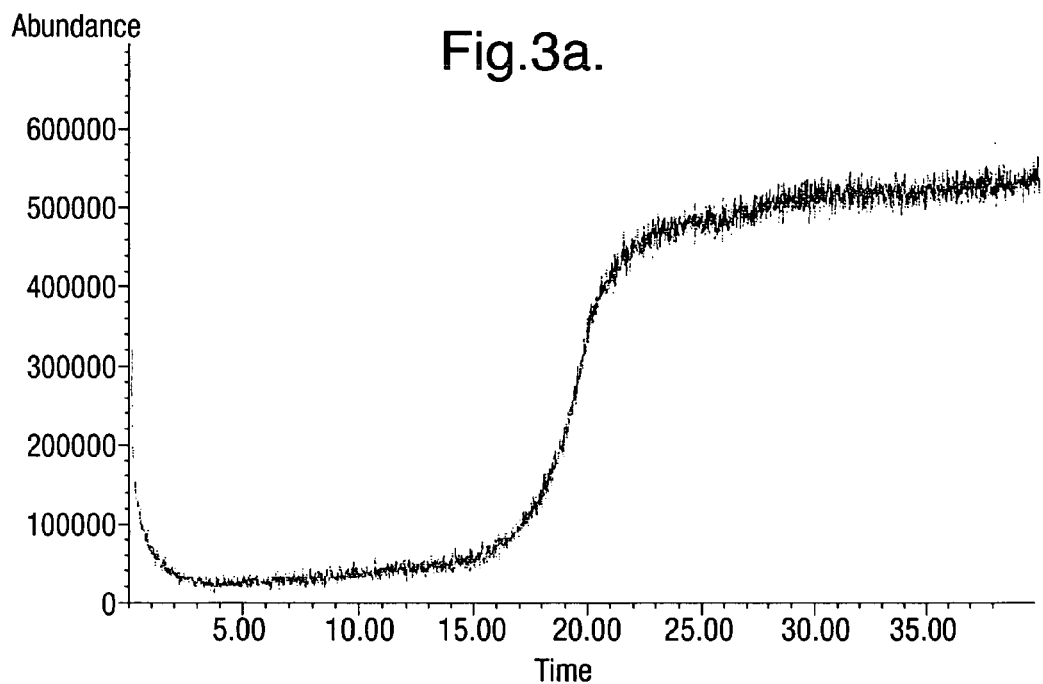
FIG. 3a shows bleeding of poly(ethyleneglycol) fragments from a column with a non-deuterated poly(ethyleneglycol) stationary phase, as detected by mass spectrosocopy.

Whereas the invention is described below largely with regard to the use of deuterated poly(ethyleneglycol)s for the stationary phase of chromatography columns, it will be appreciated that other deuterated polymers may also be used for this purpose. For example, some polymers comprising a plurality of repeat units having the formula:

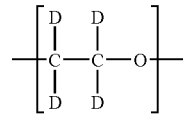

may not fall within the definition of deuterated poly(ethyleneglycol)s, but may be useful as a stationary phase material for chromatography columns. One example of such is a block heteropolymer comprising at least one deuterated poly(ethyleneglycol) chain together with one or more chains having another chemical composition(s).

Also some deuterated polymers comprising a plurality of component units arranged contiguously with one another, each one of the component units having a structure in accordance with the formula:

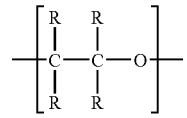

wherein each one of the —R groups is selected from the group consisting of hydrogen and deuterium, and wherein a sufficient number of the —R groups in the polymer are deuterium so that the thermal stability of the polymer is greater than would be the case if substantially all the —R groups were hydrogen, may not fall with the definition of deuterated poly (ethyleneglycol) but may still be useful for a stationary phase material. Again block heteropolymers containing at least one chain of deuterated poly(ethyleneglycol) are one example falling within this category.

However, deuterated polymers which have no poly(ethyleneglycol) component may still be useful as stationary phase materials. Examples of such deuterated polymers include deuterated poly(siloxanes).

Deuterated Poly(ethyleneglycol)s

Deuterated poly(ethyleneglycol)s may be advantageously used for the stationary phase of chromatography columns, particularly gas chromatography columns. The deuterated poly(ethyleneglycol)s may be, for example: straight chain deuterated diol poly(ethyleneglycol), straight chain deuterated poly(ethyleneglycol) with one or both ends having a group or groups other than hydroxyl (where both ends are not hydroxyl, the groups may be the same as one another or different); a branched chain deuterated poly(ethyleneglycol), a poly arm deuterated poly(ethyleneglycol), or a deuterated cross-linked network of poly(ethyleneglycol) chains. In the cases of deuterated branched or deuterated poly arm forms of poly(ethyleneglycol), free terminals may have hydroxyl groups or other groups, and they may be the same or different from one another. Stationary phases may also be formed from mixtures of different deuterated poly(ethyleneglycol)s.

In general, any type of non-deuterated poly(ethyleneglycol), which may be used as a stationary phase material in a chromatography column may also be used as a stationary phase material in deuterated form. The only difference is that some or all of the hydrogen atoms are replaced with deuterium, and as indicated above, this may lead to an increased thermal stability.

Preferably, deuterated poly(ethyleneglycol) used as a stationary phase in gas chromatography has a molecular weight of at least 1000. At lower molecular weights, the vapour pressure of the individual molecules may be such that molecules become dislodged from the chromatography column and enter the detector (referred to as bleeding). Unless cross-linked deuterated poly(ethyleneglycol) is to be used as a stationary phase, the molecular weight of the deuterated poly(ethyleneglycol) within the column is preferably no more than 1,000,000. At higher molecular weights, the solubility of the polymer in the coating solvents (see below) may be undesirably low. Where the stationary phase is to be a cross-linked form of deuterated poly(ethyleneglycol), the molecular weight after cross-linking may be considerably more than 1 million.

The number (n) of component units per polymer molecule is preferably in the range from about 20 to about 20,000 (unless the deuterated polyethylene glycol is to be cross-linked), but can be less or more.

Deuterated poly(ethyleneglycol)s used for stationary phase materials are preferably reasonably mondisperse but polydisperse preparations may also be used.

Various forms of deuterated poly(ethyleneglycol) are commercially available. For example, straight chain deuterated diol poly(ethyleneglycol) together with various forms of straight chain deuterated poly(ethyleneglycol) having different terminal groups, are available from Polymer Source Inc. of Montreal Canada.

Alternatively, deuterated poly(ethyleneglycol)s can be prepared by polymerisation of deuterated (D4) ethylene oxide (which is also commercially available), in the same way as non-deuterated poly(ethyleneglycol)s can be prepared by polymerisation of non-deuterated ethylene oxide. This may be represented as follows:

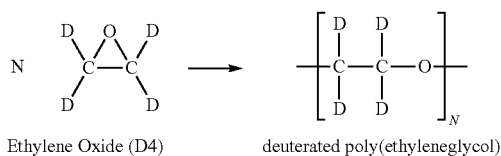

Ethylene Oxide (D4) → deuterated poly(ethyleneglycol)

In general straight chain diol deuterated poly(ethyleneglycol)s, straight chain deuterated poly(ethyleneglycol)s with one or both terminal groups other than hydroxyl, and all forms of branched, poly arm and cross-linked deuterated poly(ethyleneglycol)s can be prepared using the appropriate deuterated monomer or deuterated poly(ethyleneglycol), using exactly the same methodology that would be used to prepare the equivalent non-deuterated poly(ethyleneglycol). All terminal modifications that can be performed on non-deuterated poly(ethyleneglycol)s can also be performed, in the same way, on deuterated poly(ethyleneglycol)s.

Deuterated ethylene oxide (D4) is available (for example from Sigma-Aldrich) at a guaranteed purity of 98 atom % deuterium. Accordingly, although most molecules of deuterated ethylene oxide will have four atoms of deuterium, as shown above, some of the molecules will have one or more atoms of hydrogen, in place of the deuterium. Accordingly, when deuterated ethylene oxide of this purity is polymerised to form deuterated poly(ethyleneglycol), the majority of the component units of the polymer will have the formula:

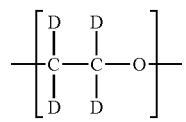

However, some of the components units of the deuterated poly(ethyleneglycol) will have a structure corresponding to the formula:

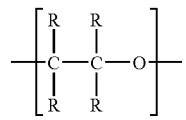

wherein each of the —R groups is either hydrogen or deuterium, and wherein one or more of the —R groups is hydrogen. It is believed that deuterated poly(ethyleneglycol) obtained from commercial sources will also have small amounts of hydrogen, in place of deuterium, as they will be prepared from monomers which do not have complete 100% deuterium atom purity.

Accordingly, most deuterated poly(ethyleneglycol)s will, strictly speaking, be partially deuterated, and the term deuterated, as used herein, covers partially and fully deuterated.

As demonstrated below, poly(ethyleneglycol) which has a high degree of deuteration, such as a deuterium atom purity of 98% or greater, has enhanced thermal stability as compared to poly(ethyleneglycol) which is identical with the exception of being non-deuterated. However, it is believed that lower degrees of deuteration may also cause useful increases in thermal stability and that the increase in thermal stability will be generally proportional to the degree of deuteration.

For example, it is believed that a poly(ethyleneglycol) having about 50% deuterium and about 50% hydrogen will exhibit a significantly greater thermal stability as compared to a comparable poly(ethyleneglycol) having substantially all hydrogen and no deuterium. Poly(ethyleneglycol)s having both deuterium and hydrogen (eg 50:50) could be manufactured by copolymerising deuterated (D4) ethylene oxide together with non-deuterated ethylene oxide in appropriate proportions to achieve the required degree of deuteration. The reaction may be shown schematically as follows:

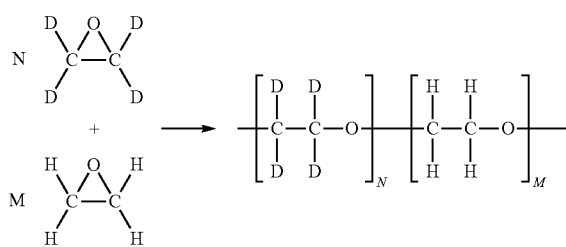

Accordingly, the partially deuterated poly(ethyleneglycol) prepared in this way will largely consist of component units having the formula:

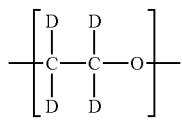

and also component units having the formula:

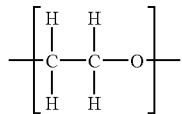

In addition, however, if the deuterated ethylene oxide is not 100% deuterium atom pure, then the heteropolymer may also have a small amount of component units having structures in accordance with the formula:

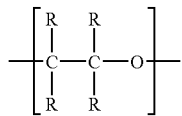

wherein some of the —R groups are hydrogen and the other —R groups are deuterium.

In a heteropolymer made in this way, the distribution of the component units will be random.

It will be appreciated that in non-deuterated poly(ethyleneglycol)s substantially all of the —R groups of the component units:

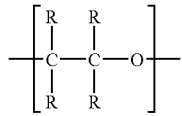

are hydrogen. However, a very small percentage of the —R groups will be deuterium due to the natural prevalence of deuterium (natural hydrogen contains about 0.015% deuterium). Despite the possible deuterium content, such poly(ethyleneglycol)s are not considered to be deuterated. The natural prevalence of deuterium is sufficently low so that component units having deuterium for all four —R groups would not occur. In general, polymers having less than 1% deuterium, as a percentage of deuterium plus hydrogen, are not considered to be deuterated for the present purposes.

As indicated above, the deuterated polymers of the current invention preferably have a sufficient amount of deuterium to increase the thermal stability of the polymers as compared to the thermal stability that would be exhibited if the deuterium was replaced with hydrogen. The deuterium content required to increase thermal stability may vary depending on the precise nature of the polymer. Preferably, the amount of deuterium in the polymer will be, as a percentage of hydrogen plus deuterium, at least 10%. More preferably, this percentage will be at least 50%, or at least 90%. Most preferably, the percentage will be at least 98%.

Manufacture of Chromatography Columns Having a Stationary Phase Comprising a Deuterated Poly(ethyleneglycol)

Chromatography columns having stationary phases comprising deuterated polymers may be prepared using any method by which chromatography columns having stationary phases comprising comparable non-deuterated polymers may be made.

For example, gas chromatography columns having a deuterated poly(ethyleneglycol) as the stationary phase may be prepared in any way suitable for preparing chromatography columns with a comparable non-deuterated poly(ethyleneglycol) as the stationary phase. The gas chromatography column will preferably have a length of from 1 m to 100 m and an internal diameter of from 0.05 to 1 mm.

By way of specific example, wall coated open tubular (WCOT) gas chromatography columns using a deuterated poly(ethyleneglycol) as the stationary phase may be prepared using the static coating procedure which is widely used for the preparation of WCOT columns with a non-deuterated poly(ethyleneglycol) as the stationary phase. In this process, a fused silica capillary tube, or a metal capillary tube, is filled with a homogeneous solution of a deuterated poly(ethyleneglycol) in an easy evaporating solvent. The deuterated poly(ethyleneglycol) may be straight chain, branched chain or poly arm and it may have terminals in the form of hydroxyl groups or other groups. The filled capillary column is sealed at one end and the other end of the capillary column is connected to a vacuum chamber. The solvent in which the deuterated poly(ethyleneglycol) was dissolved will evaporate, leaving the deuterated poly(ethyleneglycol) as a thin coating on the inner wall of the capillary column.

Deuterated poly(ethyleneglycol) coatings (that is to say the stationary phase) prepared in this way, may have a thickness in the range of from 0.1 micrometers to 10 micrometers.

Alternatively, gas chromatography WCOT columns having a deuterated poly(ethyleneglycol) as the stationary phase may be prepared using the dynamic coating process which is known for preparing stationary phase coatings of non-deuterated poly(ethyleneglycol)s. In this process, an empty capillary column, either a fused silica capillary or a metal capillary, is partially filled with a concentrated solution of the deuterated poly(ethyleneglycol) in a solvent which readily evaporates. The plug of solvent is pushed through the capillary column leaving a thin layer of solvent with dissolved deuterated poly(ethyleneglycol) on the capillary wall. After the plug of solvent has left the capillary at the exit end, the solvent in the capillary is evaporated in a stream of gas passed through the capillary column. As the solvent evaporates, the deuterated poly(ethyleneglycol) is left as a coating on the inner capillary wall so as to form the stationary phase. Again, coatings formed in this way may have a thickness of from about 0.1 micrometers to about 5 micrometers.

Any other method for forming a poly(ethyleneglycol) stationary phase may be used to form a deuterated poly(ethyleneglycol) stationary phase.

Deuterated PEG may also be used in cross-linked form. In this case, especially for chromatography columns such as gas chromatography columns, straight chain, branched chain or multi arm forms of deuterated poly(ethyleneglycol) may be used to prepare the stationary phase in the column (as described below), and then the straight chains, branched chains or multi arm forms can be crossed-linked together in situ. Alternatively, mixtures of different types of poly(ethyleneglycol)s, for example mixtures of two or more of straight chain, branched and multiarm, can be cross-linked together to form a cross-linked stationary phase. The formation of a cross-linked deuterated poly(ethyleneglycol) stationary phase in this way is advantageous as the deuterated poly(ethyleneglycol) becomes insoluble. This means that the column can be washed with solvents, so as to remove impurities, without removing the deuterated poly(ethyleneglycol) stationary phase. Additionally, larger amounts of liquid can be injected onto the column without dissolving the deuterated poly(ethyleneglycol) stationary phase. Additionally, cross-linking improves the mechanical stability of the stationary phase, and may also improve thermal stability and reduce bleeding.

Deuterated polymer may be used to form stationary phases in other types of columns. For example, deuterated polymers could be used to form the stationary phases of packed columns. In this case, the deuterated polymer is formed as a coating on solid porous particles which are packed into a column, such as a glass column. Alternatively, deuterated polymers may be used to form the stationary phase in gas chromatography support coated open tubular (SCOT) columns. In this case, a support material is bonded to the walls of a capillary column and the deuterated polymer is then coated onto the support material. Deuterated polymers may also be used to form stationary phases in porous layer open tubular columns.

The following examples illustrate the invention.

Example 1

In this example, a straight chain deuterated diol poly(ethyleneglycol) was subjected to thermogravimetric analysis alongside a comparable non-deuterated straight chain diol poly(ethyleneglycol). The deuterated poly(ethyleneglycol) had a $M_n$ of 22,000 and a $M_w$ of 20,000 ($M_w/M_n$=1.10). The non-deuterated poly(ethyleneglycol) had a $M_n$ of 19,000 and a $M_w$ of 20,400 ($M_w/M_n$=1.07). Both polymers had been prepared by the same methodology (but using deuterated and non-deuterated monomers as appropriate), had the same chemical background and were obtained from the same supplier. The deuterated poly(ethyleneglycol) had a deuterium atom percentage purity of 98% or greater.

A sample of the deuterated poly(ethyleneglycol) (about 11 mg) was placed into a 70 microliter capacity alumina cup. The sample was weighed. A sample (about 11 mg) of the non-deuterated poly(ethyleneglycol) was similarly placed into another 70 microliter alumina cup and weighed. The cups were then placed into a thermogravimetric analyser. The thermogravimetric analyser was programmed to maintain the cups at a constant temperature of 25° C. for 30 minutes, immediately followed by increasing the temperature from 25° C. to 900° C. at a rate of 10° C. per minute, immediately followed by maintaining the temperature of the cups at 900° C. for 15 minutes. Weight loss from each of the two cups was monitored over time and was corrected for a blank 70 microliter cup subjected to the same heating regime, and normalised to sample size. The thermogravimetric analysis was performed under nitrogen.

The results are shown in FIG. 1, which shows the percentage remaining weight on the Y axis against the temperature (and time) on the X axis. The percentage remaining weight of the deuterated poly(ethyleneglycol) is shown by the line marked A and the percentage remaining weight of the non-deuterated poly(ethyleneglycol) is shown by the line marked B.

As will be seen from FIG. 1, the curve of the deuterated poly(ethyleneglycol) shows a 20° C. enhanced thermostability as compared to the non-deuterated poly(ethyleneglycol).

Example 2

In Example 2, two WCOT gas chromatography columns were prepared using a deuterated poly(ethyleneglycol) as the stationary phase and two gas chromatography WCOT columns were prepared using a non-deuterated poly(ethyleneglycol). The deuterated poly(ethyleneglycol) and the non-deuterated poly(ethyleneglycol) were the same as those used in Example 1.

The capillaries used to prepare the gas chromatography columns were identical, and were fused silica capillaries with a length of 30 meters and an internal diameter of 0.25 mm.

An identical methodology was used to prepare the stationary phase coatings of the deuterated poly(ethyleneglycol), in the deuterated columns, and the non-deuterated poly(ethyleneglycol), in the non-deuterated columns. Each fused silica capillary was filled with a 0.4% (w/v) solution of the appropriate polymer (either deuterated or non-deuterated) in methylformate. The capillary was then sealed at one end and a vacuum was applied to the other, open end. After evaporation of the methylformate, a 0.25 micrometer thin layer of the polymer was left on the inner surface of the fused silica capillary.

Example 3

In Example 3, the two columns prepared in Example 2 and having the deuterated poly(ethyleneglycol) as the stationary phase, and the two columns prepared in Example 2 and having the non-deuterated poly(ethyleneglycol) as the stationary phase, were each used to separate a mixture of seven non polar substances and their chromatographic performances were compared.

Each column was used with a CP 9000 gas chromatograph. The oven temperature was 120° C. The carrier gas was hydrogen provided at 72 kPa (10 psi). The injector temperature was 250° C. The injector was a split type injector (100 ml per minute). The detector was a flame ionisation detector operated at 275° C. The injection volume was 0.1 microliters.

The sample used was a standard test mix consisting of 5-nonanone, 1-octanol, n-hexadecane, n-heptadecane, naphthalene, n-octadecane, and 2,6-dimethylaniline in cyclohexane. Each analyte was present at 0.1%.

The chromatographic performances of the columns having deuterated poly(ethyleneglycol) and the columns having non-deuterated poly(ethyleneglycol) are shown in Table 1. As seen in Table 1, the columns with deuterated and non-deuterated stationary phases show the same selectivity (that is to say the components of the test sample eluted in the same order). Also, the retention characteristics (the capacity factors) are similar for the two columns. Accordingly, no change in selectivity or permeability occurs when the hydrogen atoms of poly(ethyleneglycol) are replaced by deuterium.

TABLE 1

| | Column No. | | | |
|---|---|---|---|---|
| | 9038458 | 9038484 | 9038995 | 9038994 |
| Stationary Phase | Non-deuterated PEG | Non-deuterated PEG | Deuterated PEG | Deuterated PEG |
| Peak ID [sec] | | | | |
| T0 [sec] | 84.9 | 84.9 | 84.9 | 83.2 |
| 5-Nonanone | 169.2 | 169.5 | 160.8 | 156.2 |
| 1-Octanol | 329.7 | 330.9 | 310.5 | 298.3 |
| n-Hexadecane | 420.3 | 421.2 | 375.6 | 360 |
| n-Heptadecane | 641.4 | 642.9 | 566.4 | 540.5 |
| Naphthalene | 688.5 | 691.2 | 628.2 | 601.4 |
| n-Octadecane | 1006.2 | 1008.9 | 881.1 | 837.4 |
| 2,6-Dimethylaniline | 1059.9 | 1065.6 | 975.6 | 929.5 |
| U (cm/s) | 35.3 | 35.3 | 35.3 | 36.1 |
| k DMA | 11.484 | 11.551 | 10.491 | 10.172 |
| df (μm) | 0.269 | 0.271 | 0.246 | 0.238 |
| N DMA | 109446 | 106990 | 111772 | 117876 |
| N/m | 3648 | 3566 | 3726 | 3929 |
| RI 8-ol. | 1537.10 | 1537.61 | 1549.26 | 1549.25 |
| RI DMA. | 1811.24 | 1811.81 | 1822.30 | 1823.03 |
| As. C8-ol | 3.40 | 3.31 | 1.88 | 1.89 |
| Bleeding [pA] | | | | |
| Signal at 265° C. | | | 11.65 | |
| Signal at 250° C. | 14.31 | 20.11 | 9.31 | 8.72 |
| Signal at 150° C. | 4.12 | 9.4 | 8.3 | 7.84 |
| Sensitivity detector | 25.7 | 34.2 | 34.2 | 28 |
| Bleed at 265° C. | | | 1.5 | |
| Bleed at 250° C. | 5.95 | 4.70 | 0.44 | 0.47 |
| At 265° C. Norm. to 0.25μ | | | 1.49 | |
| At 250° C. Norm. to 0.25μ | 5.53 | 4.34 | 0.45 | 0.49 |

Example 4

In Example 4, a column with deuterated poly(ethyleneglycol) as the stationary phase, and a column with non-deuterated poly(ethyleneglycol) as the stationary phase, as prepared in Example 2, were subjected to bleed tests while temperature was steadily increased.

Hydrogen gas at 72 kPa was passed through each column while the column temperature was increased steadily from 50° C. to 250° C. A flame ionisation detector was used to detect substances bleeding from the columns.

The results are shown in FIG. 2, in which the column with deuterated poly(ethyleneglycol) is represented by line A and the column with non-deuterated poly(ethyleneglycol) is represented by line B. The Y axis represents the flame ionisation detection signal, and the X axis represents temperature increasing from 50° C. to 250° C.

As shown in FIG. 2, the flame ionisation detector signal started to increase for the non-deuterated poly(ethyleneglycol) column at a lower temperature than for the deuterated poly(ethyleneglycol) column. Additionally, the flame ionisation detector signal for the non-deuterated column reached a much higher plateau than that demonstrated by the deuterated poly(ethyleneglycol) column.

These results indicate that the non-deuterated poly(ethyleneglycol) stationary phase underwent thermal degradation at lower temperatures, and to a greater extent, as compared to the deuterated poly(ethyleneglycol) stationary phase. The flame ionisation detector signals represent fragments of the stationary phase, which bleed from the columns.

Additionally, bleed values for the two columns with deuterated poly(ethyleneglycol) and the two columns with non-deuterated poly(ethyleneglycol), from Example 3, are given in Table 1 for 250° C. As will be seen, the bleed level from the columns with non-deuterated poly(ethyleneglycol) was about ten fold the bleed level from the columns with deuterated poly(ethyleneglycol), at this temperature.

These results indicate that the increased thermal stability exhibited by deuterated poly(ethyleneglycol) translates, advantageously, into a reduced bleed level when a deuterated poly(ethyleneglycol) is used as a stationary phase in gas chromatography.

Example 5

In Example 5, a column having a stationary phase consisting of non-deuterated methacrylate poly(ethyleneglycol) (m.wt 6 k) and a column having a stationary phase consisting of deuterated poly(ethyleneglycol) (m.wt. 20 k) were compared for bleed levels, first using flame ionisation detection (FID) and then using quadrupole mass spectroscopy (MS). Both columns were 30 m long with an internal diameter of 0.25 mm and a stationary phase thickness of 0.25 μm. The column temperature was 250° C.

The results are shown in Table 2 and in FIGS. 3a, 3b, 4a and 4b.

TABLE 2

| | FID signal (pA) | |
|---|---|---|
| Column | Nett. bleed | MS counts |
| Methacrylate PEG 6M | 3.8 | 500000 |
| Deuterated PEG 20M | 0.5 | 140000 |

As shown in Table 2, the bleed rate, as detected by FID, for the deuterated poly(ethyleneglycol) column is approximately 13% of that for the non-deuterated poly(ethyleneglycol) column.

As seen in Table 2, and by comparing FIG. 3a (which relates to the non-deuterated PEG column) against FIG. 4a (which relates to the deuterated PEG column), the bleed level, as detected by mass spectroscopy, for the deuterated poly (ethyleneglycol) column was approximately 28% of that for the non-deuterated poly(ethyleneglycol) column.

Accordingly, the use of deuterated poly(ethyleneglycol) leads to a greater stationary phase stability and decreased bleed level as detected by both FID and mass spectroscopy.

Figure 3B:
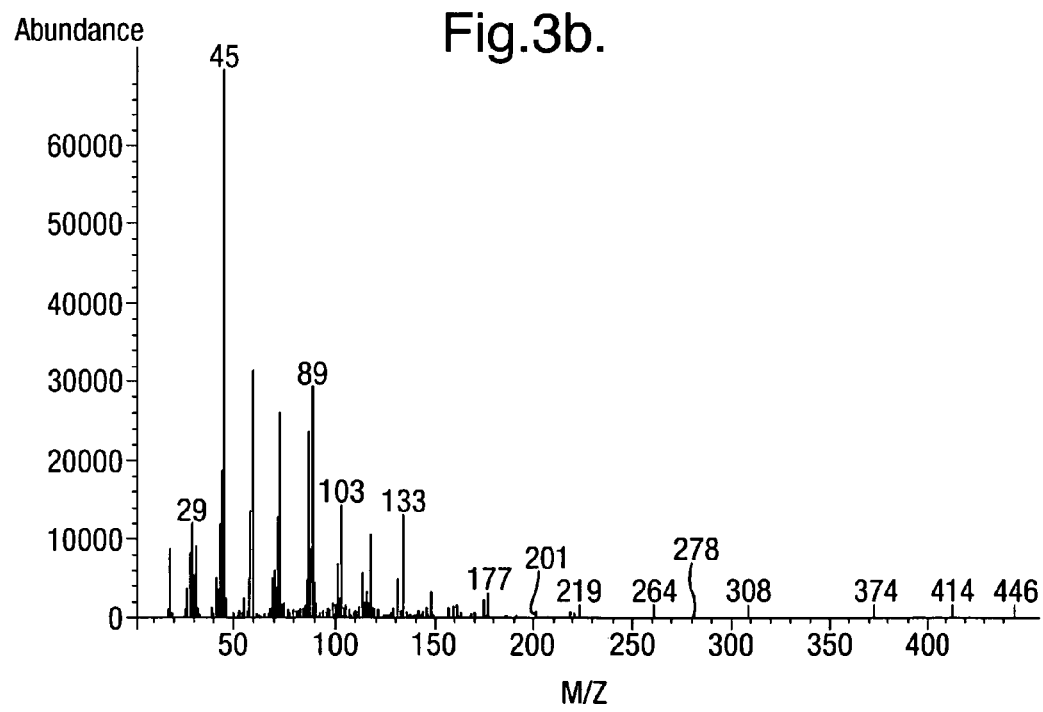

A comparison of FIG. 3b (which relates to the non-deuterated PEG column) and FIG. 4b (which relates to the deuterated PEG column) shows that the deuterated poly(ethyleneglycol) fragments which bleed from the deuterated poly (ethyleneglycol) column have a greater mass than the poly (ethyleneglycol) fragments which bleed from the non-deuterated poly(ethyleneglycol) column. This is because the atomic weight of deuterium is twice that of hydrogen.

What is claimed is:

1. A gas chromatography column having a stationary phase comprising a polymer, which comprises a plurality of component units arranged contiguously with one another, each one of the component units having a structure in accordance with the formula:

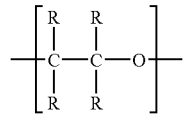

wherein each one of the —R groups is selected from the group consisting of hydrogen (—H) and deuterium (-D), and wherein at least 90% of the —R groups are deuterium so that the thermal stability of the polymer is greater than would be the case if substantially all the —R groups were hydrogen.

2. The column according to claim 1, wherein the plurality of component units comprises a first subset of the component units for which the structure is:

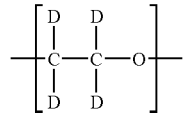

and a second subset of the component units for which the structure is:

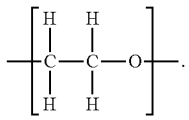

3. The column according to claim 2, wherein the polymer is substantially a copolymer of the component units:

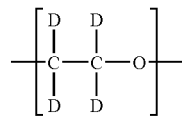

and

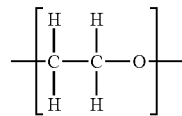

wherein N+M is from about 20 to about 20,000.

4. The column according to claim 1, wherein at least 98% of the —R groups are deuterium.

5. The column according to claim 1, wherein the polymer is a poly(ethyleneglycol) which is at least partially deuterated.

6. The column according to claim 1, wherein the polymer comprises at least one chain of poly(ethyleneglycol) wherein the number of atoms of deuterium in the at least one chain as a percentage of the number of atoms of deuterium plus hydrogen in the at least one chain is at least 90%.

7. The column according to claim 6, wherein the number of atoms of deuterium in the at least one chain as a percentage of the number of atoms of deuterium plus hydrogen in the at least one chain is at least 98%.

8. The column according to claim 1, wherein the polymer is a straight chain polymer.

9. The column according to claim 1, wherein the polymer is a branched chain polymer or a multi arm polymer.

10. The column according to claim 1, wherein the polymer has a molecular weight of from 1000 to 1,000,000 in its uncross-linked form.

11. The column according to claim 1, wherein the column is a wall coated open tubular (WCOT) column.

12. The column according to claim 1, wherein the column includes a fused silica capillary within which the stationary phase is provided.

13. The column according to claim 1, wherein the column includes a metal capillary within which the stationary phase is provided.

14. The column according to claim 1, wherein the polymer is cross-linked.

* * * * *

UNITED STATES PATENT AND TRADEMARK OFFICE
CERTIFICATE OF CORRECTION

PATENT NO. : 9,034,186 B2  
APPLICATION NO. : 11/334961  
DATED : May 19, 2015  
INVENTOR(S) : Franciscus Biermans et al.

Page 1 of 1

It is certified that error appears in the above-identified patent and that said Letters Patent is hereby corrected as shown below:

On the title page, in item (56), in column 2, under "Other Publications", line 2, delete "Polyoxyethylene)-Based" and insert -- Poly(oxyethylene)-Based --, therefor.

In column 1, line 8, delete "abreviated" and insert -- abbreviated --, therefor.

In column 4, line 6, delete "spectrosocopy;" and insert -- spectroscopy; --, therefor.

In column 4, line 12, delete "spectrosocopy;" and insert -- spectroscopy; --, therefor.

In column 5, line 44, delete "mondisperse" and insert -- monodisperse --, therefor.

In column 7, line 65, delete "sufficently" and insert -- sufficiently --, therefor.

In column 14, line 5-9, In Claim 3, delete " 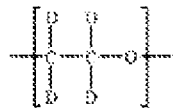 " and insert -- 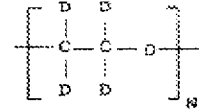 --, therefor.

In column 14, line 13-18, In Claim 3, delete " 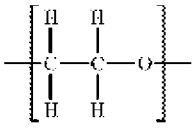 " and insert -- 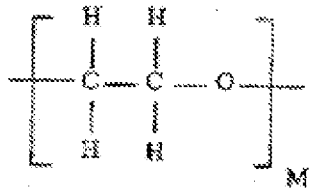 --, therefor.

Signed and Sealed this  
Seventeenth Day of November, 2015

Michelle K. Lee  
*Director of the United States Patent and Trademark Office*